United States Patent [19]
van der Lely

[11] 3,946,544
[45] Mar. 30, 1976

[54] ROTARY RAKE MEMBERS

[76] Inventor: Cornelis van der Lely, 7, Bruschenrain, Zug, Switzerland

[22] Filed: July 2, 1974

[21] Appl. No.: 485,257

[30] Foreign Application Priority Data
July 5, 1973 Netherlands.................... 7309381

[52] U.S. Cl. .................................................. 56/370
[51] Int. Cl.² .......................................... A01D 79/00
[58] Field of Search .............. 56/370, 375, 376, 400

[56] References Cited
UNITED STATES PATENTS
| | | | |
|---|---|---|---|
| 3,579,972 | 5/1971 | Sears.................................... | 56/370 |
| 3,664,106 | 5/1972 | Maugg.................................. | 56/370 |
| 3,827,224 | 8/1974 | Mulder et al. ....................... | 56/370 |

*Primary Examiner*—Russell R. Kinsey
*Attorney, Agent, or Firm*—Mason, Mason & Albright

[57] ABSTRACT

A rake machine has one or more circular rake members that is rotatable about an upwardly extending axis. Each rake member has an outer rim to which depending sleeves are attached and a shaft is turnably received in each sleeve. The lower end of each shaft is pivoted to a time support and each support has an outer end with a pair of times pivotally connected thereto. The supports each have thin inner ends located within the rim and a counter-weight is secured to each inner end. The supports are shaped so that upon rotation, the tines pivot outwardly, or generally radially, with respect to the member's axis of rotation whereupon the center of gravity of each support is shifted so that the supports pivot about the rim to position the tines further outwardly. A setting disc around the member's axis of rotation can be fixed in several positions to change the working positions of the tines and each shaft is interconnected to the disc via an arm that has a pin which fit in one of the slots around the periphery of the disc so that turning the disc turns the support and its tines.

43 Claims, 6 Drawing Figures

Fig.1

ROTARY RAKE MEMBERS

This invention relates to rotary rake members and to hay making machines and like implements that are provided with such members.

According to one aspect of the invention, there is provided a rotary rake member comprising a plurality of tines that are connected to supports in such a way as to be pivotable relative to those supports at least in directions outwardly away from the intended axis of rotation of the rake member, wherein the tine supports themselves are pivotable about further axes relative to the remainder of the rake member and are arranged to co-operate with counterweights, the construction and arrangement of the rake member being such that, during rotation thereof at an operational speed, the tines turn outwardly about their pivotal connections with the supports and the supports turn outwardly about said further axes, and such that, when the rake member is not rotating, the provision of the counterweights causes the tines and their supports to occupy inwardly folded positions.

For a better understanding of the invention, and to show how the same may be carried into effect, reference will now be made, by way of example, to the accompanying drawings, in which.

Figure 1:
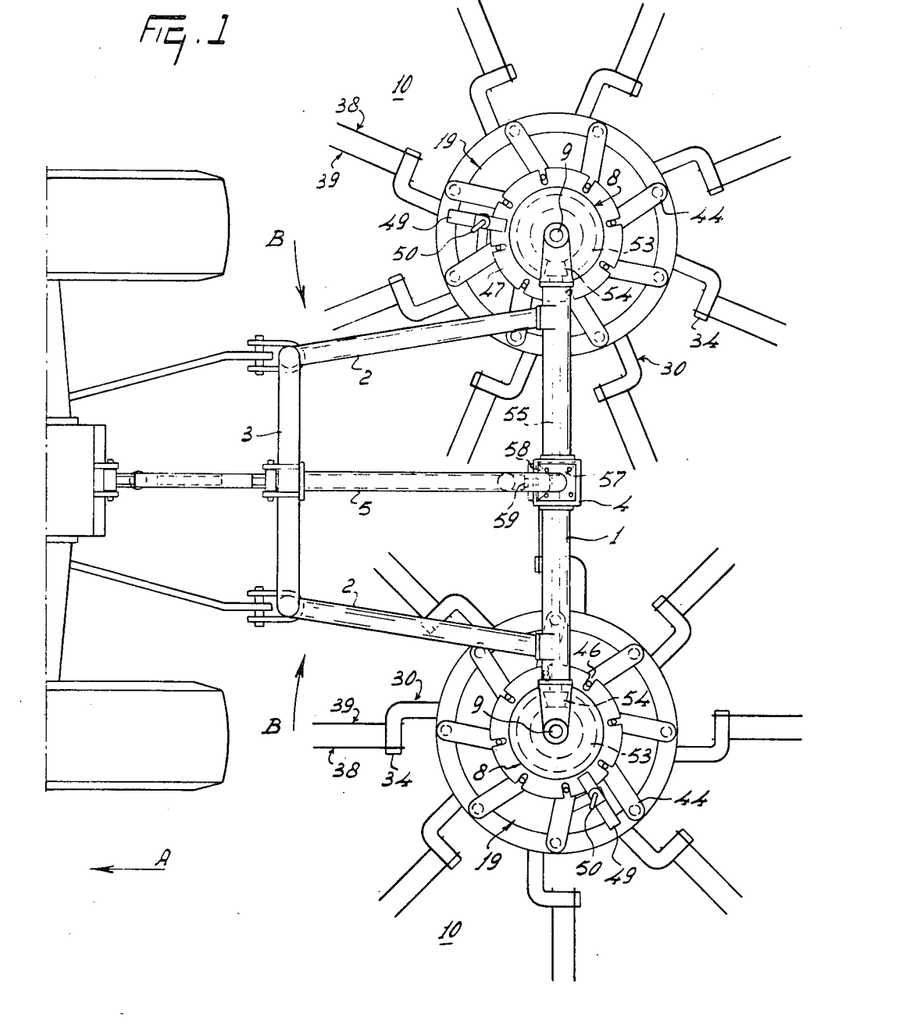
FIG. 1 is a plan view of a hay making machine comprising two rake members in accordance with the invention, the machine being connected to the rear of an agricultural tractor.

Referring to FIGS. 1 to 5 of the drawings, the haymaking machine or implement which is illustrated has a frame which comprises a substantially horizontally disposed hollow main frame beam 1 that extends transverse, and normally substantially perpendicular, to the intended direction of operative travel of the machine which is indicated by an arrow A in FIG. 1. As seen in plan view (FIG. 1), two beams 2 extend forwardly in gently convergent relationship with respect to the direction A from locations close to the opposite ends of the main frame beam 1. The leading ends of the two frame beams 2 are fastened to the limbs of a coupling member 3 that is of substantially inverted U-shaped configuration. The coupling member 3 is employed in connecting the machine to the lifting links of a three-point lifting device or hitch carried at the rear of an agricultural tractor or other operating vehicle, this form of connection being known per se and being illustrated in outline in FIG. 1 of the drawings. A tie beam 5 rigidly interconnects the apex of the coupling member 3 and the top of a gear box 4 that is mounted centrally along the length of the hollow main frame beam 1.

The main frame beam 1 is formed from tubing of circular cross-section and its opposite ends have annular supports 6 (of which one can be seen in FIG. 3 of the drawings) rigidly secured to them. Each support 6 has the housing 7 of a corresponding gear box 8 fastened to it and each gear box 8 has a corresponding shaft 9 mounted centrally therein by a transverse pin 8A entered through the walls of a sleeve at the top of the housing 7. The two shafts 9 are substantially vertically disposed but will not normally be truly vertically disposed during the operation of the machine at which time their longitudinal axes will be inclined to the strictly vertical by a few degrees. The pins 8A may be readily releasable so-called "safety" pins. The longitudinal axis of each shaft 9 affords the axis of rotation of a corresponding rake member 10 which could also be considered as being a rake head or rake wheel but lower portions 11 of the two shafts 9 are shaped to receive corresponding ground wheels 12 and, in particular, to define substantially horizontal axles upon which those ground wheels 12 are rotatably mounted. The ground wheels 12 are arranged substantially centrally beneath the two rake members 10 and support those rake members during the use of the machine.

Figures 3, 4:
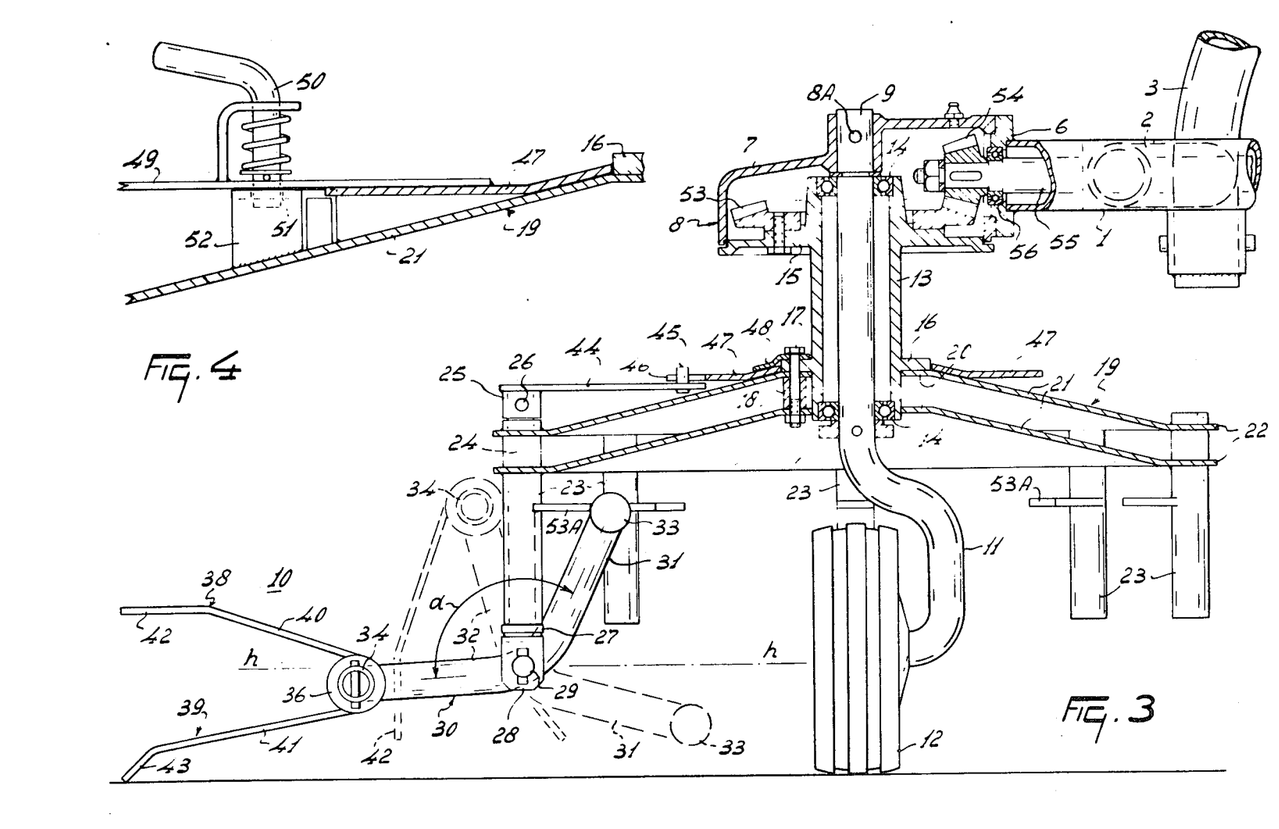
FIG. 3 is a section taken on the line III—III in FIG. 2.
FIG. 4 is a section, to an enlarged scale, taken on the line IV—IV in FIG. 2.

A sleeve 13 is rotatable around the major rectilinear portion of each shaft 9 with the aid of corresponding upper and lower ball bearings 14, each sleeve being provided, towards its upper end, with a corresponding flange 15 that is disposed substantially perpendicular to the longitudinal axis of the sleeve 13 concerned which axis is coincident with the longitudinal axis of the portion of the sleeve 9 which it surrounds. As can be seen in FIG. 3 of the drawings, the periphery of each flange 15 co-operates with a lowermost edge of the corresponding housing 7 in substantially closing the bottom of the corresponding gear box 8. Each sleeve 13 is also formed, towards its lowermost end, with a flange 16 that is smaller than the corresponding flange 15. Two plates 19 that are in spaced apart relationship are connected to flange 16 by bolts 17 and spacing sleeves 18 arranged around those bolts. The bolts 17 pass through holes in inner rims 20 of the plates 19, said inner rims 20 being disposed parallel to the flanges 16 and perpendicular to the axes of rotation of the rake members 10. The greater parts of the plates 19 are afforded by conical portions 21 that extend between the inner rims 20 and corresponding outer rims 22 which outer rims are, once again, parallel to the flanges 16 and perpendicular to the axes of rotation of the rake members 10.

Sleeves 23 are entered through holes in the outer rims 22 of the plates 19 at regular intervals of 45° around the corresponding axis of rotation, said sleeves 23 being disposed so as to extend parallel to that axis. Each sleeve 23 accommodates a corresponding shaft 24 to the upper end of which a cylindrical ring 25 is fastened by a transverse pin 26 so that the shaft 24 cannot move downwardly through its sleeve 23. The shafts 24 project from beneath the lower ends of the sleeves 23 and each of them is there provided with a shoulder 27 and a fork 28 that is located immediately beneath the shoulder 27 with its limbs directed downwardly. A substantially horizontal shaft 29 is journalled in openings in the limbs of each fork 28 and a corresponding tine support 30 is secured to one end of that shaft 29 so as to lie alongside the fork 28 rather than between the limbs thereof (see FIG. 2 of the drawings). Each support 30 is secured to the corresponding shaft 29 at substantially its midpoint and has two portions 31 and 32 that both extend substantially radially from said shaft 29 when viewed lengthwise of that shaft (FIG. 3).

As viewed in the same direction, the longitudinal axes of the two support portions 31 and 32 are inclined to each other by an obtuse angle α which is located generally above the shaft 29. The eight shafts 29 are substantially tangentially disposed with respect to a circle centered upon the axis of rotation of the corresponding rake member 10 and substantially perpendicularly intersect the longitudinal axes of the corresponding shafts 24. That portion 31 of each support 30 that is located radially inwardly from the corresponding shaft 29 is provided, at its radially inner free end, with a corresponding cylindrically shaped counterweight 33 and it will be seen from the drawings that the longitudinal axes of the eight cylindrically shaped counterweights 33 are also substantially tangentially disposed with respect to circles centered upon the axis of rotation of the corresponding rake member 10 and are parallel to the corresponding shafts 29.

The outer free end of each radially outer support portion 32 is bent to form a portion 34 that extends rearwardly from the portion 32 with respect to the intended direction of operative rotation B of the rake member 10 concerned. The portions 34 are substantially tangential to circles centered upon the axes of rotation of the two rake members 10 and are substantially parallel to the corresponding shafts 29. Each portion 34 carries a corresponding pair of tines 38 and 39, said tines 38 and 39 being integrally interconnected by a helical coil 37 that comprises several turns and that is wound around the portion 34 concerned so as to be substantially coaxial therewith but freely turnable thereabout. Each helical coil 37 and the corresponding tines 38 and 39 lie between a stop ring 35 fixedly secured to the corresponding portion 34 and a stop ring 36 releasably mounted on that portion by means of a transverse pin or the like. The coils 37 are formed integrally with the tines 38 and 39 from single lengths of resilient material such as, for example, spring steel wire or rod. The two tines 38 and 39 of each pair are spaced apart from one another in the direction B and it will be seen from FIG. 3 of the drawings that the leading tine 39 with respect to that direction is, during operation of the machine, located at a lower level than is the rear tine 38. The two tines 38 and 39 comprise straight portions 40 and 41 that extend away from the coil 37, the outermost ends of said portions 40 and 41 being integrally connected to further straight portions 42 and 43 respectively by angular bends. The portions 42 of the tines 38 are longer than the portions 43 of the tines 39 and it will be seen from FIG. 3 of the drawings that the portions 43 are bent downwardly with respect to the portions 41 to a greater extent than are the portions 42 relative to the portions 40. Each rake member 10 comprises eight pairs of tines 38, 39 that are freely turnable about the corresponding tine support portions 34.

The upper end of each of the cylindrical rings 25 is provided with a corresponding arm 44 that projects more or less radially inwardly therefrom towards the corresponding shaft 9. The inner end of each arm 44 carries an upwardly projecting pin 45 that is substantially parallel to the axis of rotation of the rake member 10 concerned. The pins 45 are received in radial slots 46 formed at 45° intervals around the edges of setting discs 47 that are disposed immediately above the upper plates 19 of each of the two pairs thereof. The setting discs 47 fit around the peripheries of the flanges 16 and inner portions thereof are shaped to match the conical configuration of the immediately underlying portions 21 of the plates 19. The setting discs 47 are angularly displaceable around the flanges 16, and thus around the axes of rotation of the rake members 10, and are retained in chosen angular settings about those axes relative to the flanges 16 of the sleeves 13, by sets of three fingers 48 that may be loosened to allow adjustments to be made, or tightened to achieve the required retaining effect, by loosening or tightening the corresponding bolts 17. Each setting disc 47 has a corresponding arm 49 (FIGS. 2 and 4 of the drawings) rigidly secured to it, said arm 49 being provided with a bracket in which a spring loaded substantially vertical locking pin 50 is mounted in such a way that the spring thereof urges the tip of the pin downwardly through a hole in the arm 49. Said tip can be entered through either chosen one of two holes 51 formed in a guide bracket 52 secured to the upper surface of the portion 21 of the upper plate 19 concerned.

The top of the flange 15 of each sleeve 13 has a toothed pinion or crown wheel 53 releasably secured to it by bolts, the teeth of said pinions or wheels 53 being in driven mesh with those of smaller toothed pinions 54 that are fastened, in the gear boxes 8, to the opposite ends of a shaft 55 that extends axially through the hollow main frame beam 1 and through the gear box 4 that is located centrally of that beam. The shaft 55 is provided, inside the gear box 4, with a bevel pinion 57 (FIG. 1) whose teeth are in driven mesh with those of a bevel pinion 58 mounted on a rotary input shaft 59 of the gear box 4. The rotary input shaft 59 projects forwardly from the gear box 4 in substantially the direction A and its leading splined or otherwise keyed end is arranged to be placed in driven connection with the power take-off shaft of the agricultural tractor or other vehicle that operates the machine during the use thereof by way of an intermediate telescopic transmission shaft of a construction that is known per se having universal joints at its opposite ends. This arrangement is visible in outline in FIG. 1 of the drawings.

In the use of the machine that has been described with reference to FIGS. 1 to 5 of the drawings, its coupling member 3 is connected to the three-point lifting device or hitch of an agricultural tractor or other operating vehicle and the rotary input shaft 59 of the gear box 4 is placed in driven connection with the power take-off shaft of the same tractor of other vehicle in the manner described above. The machine is brought to an operative or working position from an inoperative or transport position in which it is maintained clear of the ground surface by the three-point lifting device of the agricultural tractor or other operating vehicle that has just been mentioned by lowering the lifting links of said lifting device or hitch. This causes the machine to bear on the ground surface by its two ground wheels 12 that are disposed substantially centrally beneath the two rake members 10. The axes of rotation of the two rake members will then be vertically or substantially vertically disposed, the usual arrangement being such that said axes are inclined to the truly vertical by a few degrees. While the two rake members are not rotated, their tine supports 30 and the tines 38 and 39 which they carry remain in positions substantially corresponding to the position that is indicated in broken lines for one such assembly in FIG. 3 of the drawings. In this position, the support portion 34 is located at a level well above that of the corresponding shaft 29 while the corresponding portion 31 and counterweight 33 are located substantially wholly beneath a plane h—h that contains the longitudinal axis of the shaft 29 concerned and is perpendicular to the axis of rotation of the rake member 10 under considereation. When rotary dirve is applied to the two rake members 10 by way of the transmission members that are disposed between the rotary input shaft 59 and the two sleeves 13, said members 10 revolve in the opposite directions B that are shown in FIG. 1 of the drawings and the centrifugal forces which are generated by this rotation act upon the tines 38 and 39 in such a way as to turn them outwardly about the support portions 34 into substantially the positions shown in full lines in FIGS. 1 to 5 of the drawings in which positions they are substantially, but not truly, horizontally disposed and substantially, but not truly, radially orientated with respect to the axes of rotation of the two rake members 10. The outward movements of the tines 38 and 39 alter the positions of the centers of gravity of the pivotable assemblies of which they form parts with the result that said assemblies turn through a few degrees about the shafts 29 to bring them to positions in which the counterweights 33 are disposed above the plane h—h. Once this condition has been reached, the centrifugal forces that increase in magnitude as the speed of rotation of the rake members 10 increases, act upon the counterweights 33 and cause them to turn upwardly and outwardly about the shafts 29 until each assembly reaches a position substantially corresponding to the position that is illustrated in full lines for one such assembly in FIG. 3. In the position which has just been mentioned, each counterweight 33 bears against a corresponding stop 53A carried at the radially inner side of the corresponding sleeve 23. The support portions 32 that extend outwardly from the shafts 29 are substantially horizontally disposed under the conditions which have just been described and the tines 38 and 39 occupy positions in which the outer straight portions 43 of the lower tines 39 move over the ground surface and through any stubble that there may be thereon through at least part of each rotation of the corresponding rake member 10.

Figure 2:
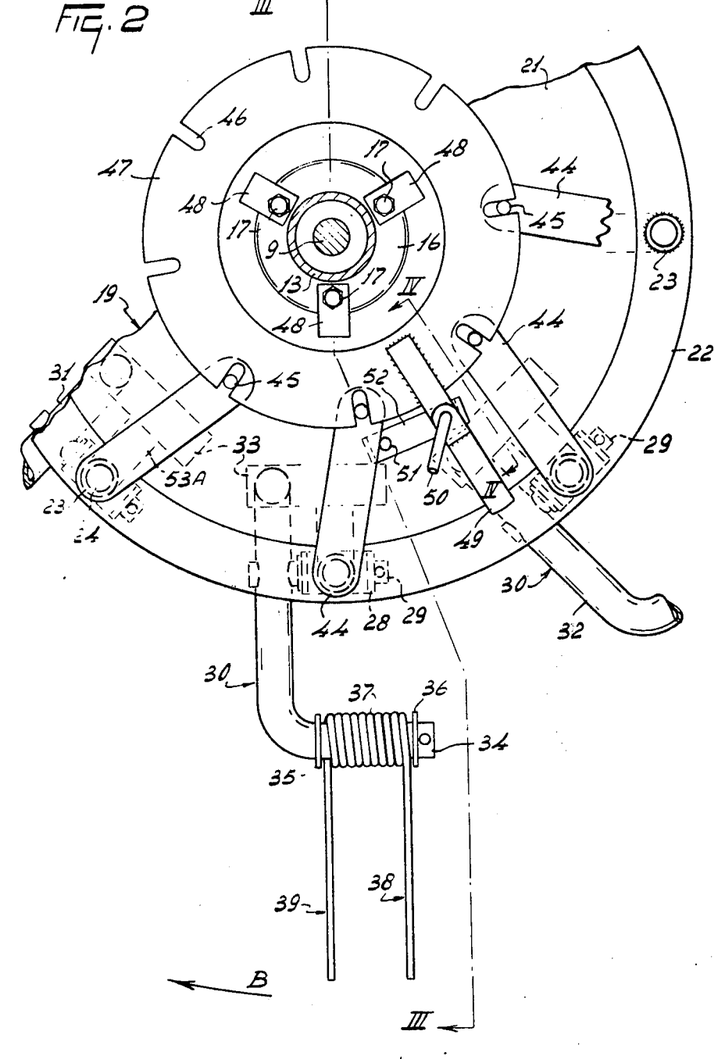
FIG. 2 is a plan view, to an enlarged scale, showing parts of one of the rake members of machine of FIG. 1 in greater detail.
Figures 5, 6:
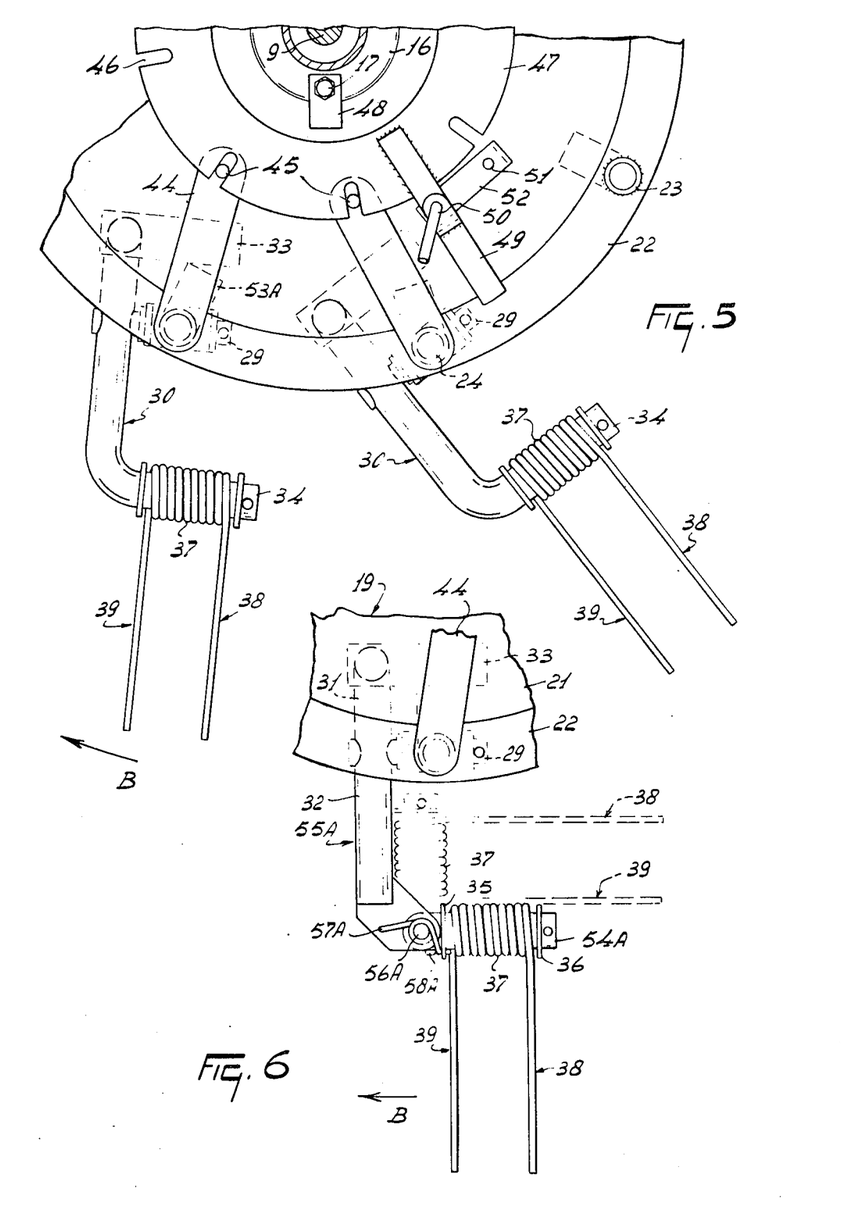
FIG. 5 is a plan view somewhat similar to FIG. 2 but illustrates alternative positions which tines of the illustrated rake member can occupy for different working operations.
FIG. 6 is a view similar to FIGS. 2 and 5 but illustrates an alternative construction for the rake member.

Hay or other crop that is picked up by the tines 38 and 39 during rotation of the rake members 10 is passed rearwardly with respect to the direction A between those rake members and may be spread more or less at random over the ground surface in the manner of a tedder or may be collected into a more or less compact swath or windrow. The angle of attack of the tines 38 and 39 is adjusted to suit whichever of these two operations is to be performed by turning the setting discs 47 to appropriate positions around the axes of rotation of the rake members and maintaining those positions by co-operation of the locking pins 50 with the corresponding holes 51. When one of the setting discs 47 is turned about the axis of rotation of the corresponding rake member 10 by means of the corresponding arm 49, the pins 45 concerned are carried along in the slots 46 and the shafts 24 are, as a consequence, angularly displaced in the sleeves 23. When the machine is to function in the manner of a tedder in which it will spread displaced hay or other crop more or less at random over the field to the rear of the machine, settings of the tines 38 and 39 generally corresponding to the settings illustrated in FIG. 2 of the drawings are appropriate. In this setting, the tines 38 and 39 are substantially radially disposed when viewed in a direction parallel to the axis of rotation of the corresponding rake member 10. However, when the hay or other displaced crop is to be collected into a more or less compact swath or windrow, the alternative tine settings illustrated in FIG. 5 of the drawings are appropriate. In this latter case, it will be seen that the tines 38 and 39 are inclined rearwardly from root to tip so as to trail to an appreciable extent relative to the corresponding direction of rotation B. It will be noted that, due to the considerable axial lengths of the counterweights 33, said counterweights will co-operate correctly with the stops 53A in the alternative tine settings that are illustrated in FIGS. 2 and 5 of the drawings and that correspond to co-operation of the illustrated locking pin 50 with the two alternative holes 51 in the guide bracket 52 shown in FIGS. 2 and 5. The positions of the support portions 34 to the rear of the portions 31 and 32 with respect to the directions B tend to prevent unwanted adherence of hay or other crop.

When a haymaking or other crop displacement operation has been completed, the three-point lifting device or hitch of the operating tractor or other vehicle is raised and drive to the rake members 10 is discontinued. As the rake members 10 come to rest, gravity acts upon the tines 38 and 39 and causes them to turn downwardly about the support portions 34 into positions corresponding to the position illustrated in broken lines in FIG. 3. The center of gravity of each assembly 30,38,39 is thus displaced radially inwardly to an extent such that the corresponding counterweight 33 can move downwardly under the action of gravity about the corresponding shaft 29 to bring the whole of each assembly that has just been mentioned to substantially the position illustrated in broken lines in FIG. 3 for one such assembly. Thus, as soon as the rake members 10 are no longer rotating, the tines 38,39 and their supports 30 fold automatically into positions in which the tines do not project outwardly from the machine thus greatly reducing the hazard which they might otherwise cause and also reducing the overall width of the whole machine to little more than the width of the path of travel of its operating tractor or other vehicle. This will be apparent from a study of FIGS. 1 and 3 of the drawings and it will be seen that the overall width of the machine when in an operative or working position is considerably greater than the overall width thereof in an inoperative or transport position.

FIG. 6 of the drawings illustrates an alternative construction in which tine supports 55A include portions 54A that are substantially tangentially disposed with respect to circles centered upon the corresponding axes of rotation. Integral pairs of tines 38 and 39 are mounted on the tine support portions 54A in a freely turnable manner in the same way as has been described above with respect to the tine support portions 34. However, in this case, each tine support portion 54A is turnable relative to the neighbouring portion 32 of the same support 55A about the axis of a pivot 56A that is parallel or substantially parallel to the axis of rotation of the rake member 10 concerned. Each pivot 56A has a corresponding coil spring 57A wound around it in such a way as to tend to maintain the corresponding support portion 54A and the tines 38 and 39 which it carries in the position shown in broken lines in FIG. 6 in which the tines 38 and 39 are directed rearwardly with respect to the corresponding direction of rotation B. The springs 57A are not very strong and can be overcome by the centrifugal forces that are generated during rotation of the rake members 10 at operational speeds. Such rotation causes the support portions 54A to be turned about the pivots 56A in a clockwise direction as seen in FIG. 6 of the drawings into positions substantially corresponding to the position illustrated in full lines in that Figure. Each tine support 55A is provided with a stop 58A that prevents the portion 54A concerned from turning outwardly too far about the pivot 56A. In an inoperative transport position of the machine in which its rake members 10 are at rest, the support portions 54A are turned inwardly about the pivots 56A by the springs 57A and the tines 38 and 39 hang downwardly under gravity from said portions 54A. Each support 55A is inwardly tilted by the corresponding counterweight 33 at such times so as to occupy a position substantially corresponding to the position shown in broken lines in FIG. 3 of the drawings for one of the tine supports 30. When the rake members 10 are caused to rotate, inertia and air resistance initially cause the tines 38 and 39 to turn rearwardly about the inwardly directed support portions 54A relative to the directions B to bring them to more or less the positions shown in broken lines in FIG. 6. The centers of gravity of the assemblies 38,39,54A are thus located behind the pivots 56A with respect to the directions B so that the centrifugal forces that are increasing in magnitude as the speed of rotation becomes greater overcome the weak springs 57A and turn the assemblies into positions substantially corresponding to the position shown in full lines in FIG. 6 in which the tines 38 and 39 project outwardly. This alteration in the position of the assemblies 38,39,54A moves the center of gravity of the larger assemblies that include the remainder of the tine supports 55A so that said larger assemblies turn about the axes of the shafts 29 whereafter the counterweights 33 move those assemblies into the outwardly projecting positions that are similar to the positions of the assemblies 30,38,39 that have already been described with particular reference to FIG. 3 of the drawings. When the rake members come to rest, the springs 57A turn the support portions 54A inwardly about the pivots 56A thus moving the centers of gravity back to locations which are such that the counterweights 33 can turn the supports 55A automatically inwards.

Although various features of the rake members and haymaking machines that have been described and/or that are illustrated in the accompanying drawings will be set forth in the following claims as inventive features, it is emphasised that the invention is not necessarily limited to those features that it includes within its scope each of the parts of each rake member and haymaking machine that has been described and/or that is illustrated in the accompanying drawings both individually and in various combinations.

What we claim is:

1. A rotary rake member having substantially vertical shaft means, outer supporting means a plurality of tines and supports that are pivotally connected to said supporting means to turn about respective axes, said rake member being rotatable about said shaft means and said tines being freely pivotable on portions of their supports, counterweights being secured to inner portions of said supports, said rake member being rotatable at an operational speed and said tines being initially pivotable on their supports from inner non-working positions to outer positions by centrifugal force to shift the centers of gravity of said supports, said tines, in their outer positions, together with their corresponding supports being turnable about their pivot connections on said supporting means by said weights to operative raking positions during rotation.

2. A rake member as claimed in claim 1, wherein the axes about which said tines are pivotable relative to their supports are substantially tangentially disposed with respect to a circle centered upon the axis of rotation of said rake member.

3. A rake member as claimed in claim 2, wherein the respective axes about which said supports are pivotable relative to said supporting means extend substantially tangentially with respect to a circle centered upon the axis of rotation of said rake member.

4. A rake member as claimed in claim 3, wherein the axes about which said tines are pivotable relative to their supports are located at greater distance from the axis of rotation of said rake member than are the respective axes about which said supports are pivotable on said supporting means.

5. A rake member as claimed in claim 4, wherein said respective axes are defined by pivot connections located substantially centrally on said tine supports.

6. A rake member as claimed in claim 5, wherein said first mentioned portions and said inner portions are inclined to one another.

7. A rake member as claimed in claim 6, wherein said portions are substantially in line with one another when said rake member is viewed in a direction parallel to its axis of rotation and extend substantially radially relative to that axis.

8. A rake member as claimed in claim 7, wherein the angle enclosed between said two relatively inclined portions is an obtuse angle that is normally located above said respective axes.

9. A rake member as claimed in claim 6, wherein said two portions are of substantially equal lengths.

10. A rake member as claimed in claim 9, wherein said first mentioned portions extend substantially radially outwards with respect to the shaft means of said rake member during operation, each of those portions including a bent outer portion that extends substantially tangentially with respect to a circle centered upon said shaft means.

11. A rake member as claimed in claim 10, wherein said outer portion is orientated rearwardly from the remainder of said support with respect to the normal direction of rotation of said rake member.

12. A rake member as claimed in claim 11, wherein the tines are mounted on and freely pivotable about their corresponding outer portions.

13. A rake member as claimed in claim 6, wherein said inner portions and said counterweights are located within said supporting means.

14. A rake member as claimed in claim 13, wherein said counterweights are substantially cylindrical in configuration and have longitudinal axes extend substantially tangential to a circle centered on said axis that of rotation.

15. A rake member as claimed in claim 1, wherein each support is turnably mounted about a corresponding pivot shaft on said supporting means and that shaft extends substantially parallel to said shaft means.

16. A rake member as claimed in claim 15, wherein said supports and tines are each turnable in common about their corresponding pivot shaft.

17. A rake member as claimed in claim 16, wherein said pivot shaft and the respective axis of each support intersect each other.

18. A rake member as claimed in claim 1, wherein each support is pivoted adjacent the lowermost end of a corresponding substantially vertical pivot shaft which depends from said supporting means.

19. A rake member as claimed in claim 18, wherein said pivot shafts are housed in sleeves on said supporting means and said supports are angularly adjustable in common with their pivot shafts, means on said rake member to turn and retain said pivot shafts with their supports in any chosen one of at least two different angular settings with respect to said shaft means.

20. A rake member as claimed in claim 19, wherein the pivot shafts have radial arms that co-operate with a setting disc on said rake member of the retaining means.

21. A rake member as claimed in claim 20, wherein said arms are fastened to the uppermost ends of said pivot shafts.

22. A rake member as claimed in claim 21, wherein said setting disc is angularly adjustable about said axis of rotation and securable in chosen angular positions about that axis.

23. A rake member as in claim 22, wherein said setting disc has slots and pins on the inner portions of said arms are received in said slots.

24. A rake member as claimed in claim 23, wherein said setting disc has a setting arm which is movable and fixable in any chosen one of at least two different angular settings about said shaft means.

25. A rake member as claimed in claim 20, wherein said arms extend inwardly from said shafts with respect to said shaft means.

26. A rake member as claimed in claim 1, wherein said tines are mounted in pairs and said pairs are each formed integrally from single lengths of resilient material.

27. A rake member as claimed in claim 26, wherein the two tines of each pair have different shapes.

28. A rake member as claimed in claim 27, wherein the two tines of each pair are located at different heights during operation.

29. A rake member as claimed in claim 28, wherein the two tines of each pair are integrally interconnected by a coil being freely pivotable relative to its corresponding support.

30. A rake member as claimed in claim 29, wherein the two tines of each pair each comprise a substantially straight portion that extends away from its corresponding coil, said straight portion of the tine that is lowermost during operation being of greater length than said straight portion of the tine that is lowermost during operation.

31. A rake member as claimed in claim 30, wherein each straight portion terminates in an outer portion that is bent relative thereto, the length of the outer portion of the tine which is uppermost during operation being greater that that of the outer portion of the tine which is lowermost during operation.

32. A rake member as claimed in claim 31, wherein the angle which is enclosed between the straight portion and the outer portion of the uppermost tine is greater than the corresponding angle in the lowermost tine.

33. A rake member as claimed in claim 30, wherein the uppermost tine of each pair is located rearwardly of the lowermost tine thereof with respect to the normal direction of rotation of said rake member.

34. A rake member as claimed in claim 1, wherein, in an inoperative transport position of said rake member, said counterweights and said inner portions are located beneath a plane that contains said resepective axes and that is substantially perpendicular to said shaft means.

35. A rake member as claimed in claim 34, wherein said counterweights and said inner ends are located above said plane during operational rotation.

36. A rake member as claimed in claim 1, wherein said supports have outer portions that extend substantially horizontal during rotation of said rake member and said tines are mounted on those outer portions.

37. A rake member as claimed in claim 36, wherein said supports each have an inner portions that is provided with a counterweight and the inner portions are inclined upwardly away from said respective axes during rotation of said rake member.

38. A rake member as claimed in claim 37, wherein said outer portions are located at lower levels than the respective axes during rotation of said rake member.

39. A rake member as claimed in claim 1, wherein said tines are mounted on outer portions of said supports and said outer portions are connected to the remainder of said supports by substantially vertical pivots, springs on said supports connected to bias said outer portions and tines inwardly about said pivots.

40. A rake member as claimed in claim 39, wherein said springs are connected to turn the tines about said vertical pivots in a horizontal direction with respect to the normal direction of rotation of said rake member.

41. A rake member as claimed in claim 40, wherein said springs are wound around said vertical pivots.

42. A machine as claimed in claim 39, wherein there are two rake members supported on said frame and driving means connected to each member to rotate same.

43. A machine comprising a frame and at least one rake member mounted on said frame and rotatable about an upwardly extending axis, said rake member being circular and having outer supporting means, sleeves depending from said supporting means, shafts housed in said sleeve supports pivoted to said shafts and tine means on outer portions of each of said supports, said tine means being freely pivotable on said outer portions, the inner ends of said supports each having a counterweight that normally biases said tine means and outer portions with tines to an elevated transport position, said supports being connected intermediate their ends by pivots to said shafts, adjusting means associated with said shafts to turn same simultaneously, with their supports and tine means, in their respective sleeves and alter the working positions of said tine means, said tine means and their supports each being pivotable about said pivots with respect to said supporting means to an inoperative position by the counterweight during the non-rotation of said member, whereby said tine means is moved inwardly towards said axis of rotation.

* * * * *

UNITED STATES PATENT OFFICE
CERTIFICATE OF CORRECTION

Patent No. 3,946,544          Dated March 30, 1976

Inventor(s) Cornelis van der Lely

It is certified that error appears in the above-identified patent and that said Letters Patent are hereby corrected as shown below:

Column 10, line 51, delete "with tines".

Signed and Sealed this

Fifth Day of October 1976

[SEAL]

Attest:

RUTH C. MASON
*Attesting Officer*

C. MARSHALL DANN
*Commissioner of Patents and Trademarks*